(12) United States Patent
Makiguchi et al.

(10) Patent No.: US 11,652,979 B2
(45) Date of Patent: May 16, 2023

(54) STEREOSCOPIC IMAGE DISPLAY SYSTEM, STEREOSCOPIC IMAGE DISPLAY METHOD AND PROJECTOR

(71) Applicant: Nippon Telegraph and Telephone Corporation, Tokyo (JP)

(72) Inventors: Motohiro Makiguchi, Musashino (JP); Hideaki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/612,913

(22) PCT Filed: May 23, 2019

(86) PCT No.: PCT/JP2019/020419
§ 371 (c)(1),
(2) Date: Nov. 19, 2021

(87) PCT Pub. No.: WO2020/235072
PCT Pub. Date: Nov. 26, 2020

(65) Prior Publication Data
US 2022/0256136 A1    Aug. 11, 2022

(51) Int. Cl.
*H04N 13/32* (2018.01)
*H04N 13/363* (2018.01)

(52) U.S. Cl.
CPC ........... *H04N 13/32* (2018.05); *H04N 13/363* (2018.05)

(58) Field of Classification Search
USPC ........................................................ 348/51
See application file for complete search history.

(56) References Cited

U.S. PATENT DOCUMENTS

| 2009/0161028 A1* | 6/2009 | Tanaka | H04N 9/3194 348/E5.138 |
| 2015/0085089 A1* | 3/2015 | Shigemura | H04N 13/351 348/54 |

(Continued)

FOREIGN PATENT DOCUMENTS

JP    2015121748 A  *  7/2015

OTHER PUBLICATIONS

Makiguchi et al., "Smooth Motion Parallax Glassless 3D Screen System Using Linear Blending of Viewing Zones and Spatially Imaged Iris Plane," SID Digest, 2017, 48(1):903-906, 4 pages.

*Primary Examiner* — Behrooz M Senfi
(74) *Attorney, Agent, or Firm* — Fish & Richardson P.C.

(57) ABSTRACT

A stereoscopic image display system includes: a plurality of projectors arranged side by side with predetermined spacing and project respectively viewpoint images for installation positions in the same direction, the viewpoint images being related to the same object; a screen displaying a superimposed image for the object, based on two adjacent images, among the projected images, that are the closest from a line-of-sight direction of an observer; and an image holding unit holding information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors. Each projector projects the first and second viewpoint images related to preceding and succeeding stages onto the screen.

3 Claims, 3 Drawing Sheets

(56) References Cited

U.S. PATENT DOCUMENTS

2022/0191464 A1* 6/2022 Makiguchi ............. G02B 30/40
2022/0239894 A1* 7/2022 Makiguchi ............ G06T 7/0002

* cited by examiner

STEREOSCOPIC IMAGE DISPLAY SYSTEM, STEREOSCOPIC IMAGE DISPLAY METHOD AND PROJECTOR

CROSS-REFERENCE TO RELATED APPLICATIONS

This application is a National Stage application under 35 U.S.C. § 371 of International Application No. PCT/JP2019/020419, having an International Filing Date of May 23, 2019, the disclosure of which is considered part of the disclosure of this application, and is incorporated in its entirety into this application.

TECHNICAL FIELD

The present invention relates to a stereoscopic image display system, a stereoscopic image display method, and a projector.

BACKGROUND ART

Conventionally, a technique for a stereoscopic image display device enabling a stereoscopic image with a motion parallax to be visually recognized by naked eyes from multiple viewpoints has been proposed. The motion parallax means a parallax occurring by movement of a viewpoint of an observer.

One of such stereoscopic image display devices is a stereoscopic image display device that projects a plurality of viewpoint images having a parallax in a horizontal direction onto a screen, respectively, using a plurality of projectors and controls a diffusion characteristic and a light collection characteristic of the screen such that an observer visually recognize respective images corresponding to a viewpoint position and both eye positions of the observer.

Among the stereoscopic image display devices, the display device utilizing a visual mechanism of a perception referred to as linear blending can project a stereoscopic image using a smaller number of projectors than that in the conventional technique (see Non-Patent Literature 1).

CITATION LIST

Non-Patent Literature

Non-Patent Literature 1: M. Makiguchi et al. "Smooth Motion Parallax Glassless 3D Screen System Using Linear Blending of Viewing Zones and Spatially Imaged Iris Plane," SID, Vol. 48, Issue 1, pp. 903-906

SUMMARY OF THE INVENTION

Technical Problem

The above-described display device using the linear blending displays two images respectively projected from adjacent projectors on a screen such that the images are visually recognized by an observer with the images synthesized at a ratio corresponding to a viewpoint position. In the case, there has been a problem that when a diffusion characteristic of the screen is large, an image projected from an unintended projector is also perceived by an observer so that an image quality deteriorates.

The present invention has been made in view of the above-described circumstances, and is directed to providing a stereoscopic image display system, a stereoscopic image display method, and a projector that enables a stereoscopic image with a motion parallax to be displayed using a small number of projectors while preventing an image quality from deteriorating.

Means for Solving the Problem

To attain the above-described object, a stereoscopic image display system according to an embodiment includes: a plurality of projectors that are arranged side by side with predetermined spacing and project respectively viewpoint images for installation positions in the same direction, the viewpoint image being related to the same object; a screen on which a superimposed image is displayed for the object to be stereoscopically viewed, by causing the left eye and the right eye of an observer to visually recognize, among the images respectively projected by the plurality of projectors, two adjacent images closest in a line-of-sight direction such that the two adjacent images are superimposed one on the other at a luminance ratio corresponding to distances to their respective display positions; and an image holding unit that holds information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors, in which each of the plurality of projectors includes a projection unit that projects, as the viewpoint image to be projected by the projector, the first viewpoint image generated from the base image to be projected by the projector in the preceding stage and the second viewpoint image generated from the base image to be projected by the projector in the succeeding stage onto the screen, from the information about the images held by the image holding unit.

A stereoscopic image display method according to the embodiment is such that, in a stereoscopic image display system including: a plurality of projectors that are arranged side by side with predetermined spacing and project respectively viewpoint images for installation positions in the same direction, the viewpoint images being related to the same object; a screen on which a superimposed image is displayed for the object to be stereoscopically viewed, by causing the left eye and the right eye of an observer to visually recognize, among the images respectively projected by the plurality of projectors, two adjacent images closest in a line-of-sight direction such that the two adjacent images are superimposed one on the other at a luminance ratio corresponding to distances to their respective display positions; and an image holding unit that holds information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors, the stereoscopic image display method including by each of the projectors, projecting, as the viewpoint image to be projected by the projector, the first viewpoint image generated from the base image to be projected by the projector in the preceding stage and the second viewpoint image generated from the base image to be projected by the projector in the succeeding stage onto the screen, from the information about the images held by the image holding unit.

A projector according to an embodiment is a projector in a stereoscopic image display system, the stereoscopic image display system including: a screen on which a superimposed image is displayed for an object to be stereoscopically viewed, by causing the left eye and the right eye of an observer to visually recognize, among images respectively projected by a plurality of projectors, two adjacent images closest in a line-of-sight direction such that the two adjacent images are superimposed one on the other at a luminance ratio corresponding to distances to their respective display positions, the plurality of projectors being arranged side by side with predetermined spacing and projecting respectively viewpoint images for installation positions in the same direction, the viewpoint images being related to the same object; and an image holding unit that holds information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors, the projector including a projection unit that projects, as the viewpoint image to be projected by the projector, the first viewpoint image generated from the base image to be projected by the projector in the preceding stage and the second viewpoint image generated from the base image to be projected by the projector in the succeeding stage onto the screen, from the information about the images held by the image holding unit.

Effects of the Invention

A stereoscopic image display system, a stereoscopic image display method, and a projector according to the present invention enable a stereoscopic image with a motion parallax to be displayed using a small number of projectors while preventing an image quality from deteriorating.

DESCRIPTION OF EMBODIMENTS

Techniques for displaying a stereoscopic image with a motion parallax on a screen such that the stereoscopic image can be visually recognized by naked eyes from multiple viewpoints will be described. One of the techniques is a technique for installing many projectors 120-0 to 120-16 side by side with predetermined spacing on a front surface of a screen 110A and projecting viewpoint images for installation positions related to the same object, respectively, as indicated by dotted lines, onto corresponding positions P0 to P16 on the screen 110A, like in a stereoscopic image display system 100A illustrated in FIG. 2.

When images at multiple viewpoints are thus displayed on the screen 110A, an observer X can visually recognize a stereoscopic image corresponding to his or her own position. For example, consider a case where the observer X has viewed the screen 110A from a position between display positions P4 and P5 in front of the screen 110A. The observer X can visually recognize a stereoscopic image corresponding to a position between the positions P4 and P5 by visually recognizing an image displayed at the position P4 with his or her left eye and visually recognizing an image displayed at the position P5 from a viewpoint that has shifted from the position P4 with his or her right eye, as indicated by dashed lines.

Even if the observer X has moved in a transverse direction in front of the screen 110A, a stereoscopic image to be observed is switched, as needed, as his or her viewpoint moves. However, to smooth the switching of the stereoscopic image to be observed, many projectors need to be installed with spacings at a smaller angle than a parallax between left and right human eyes.

Figure 3:
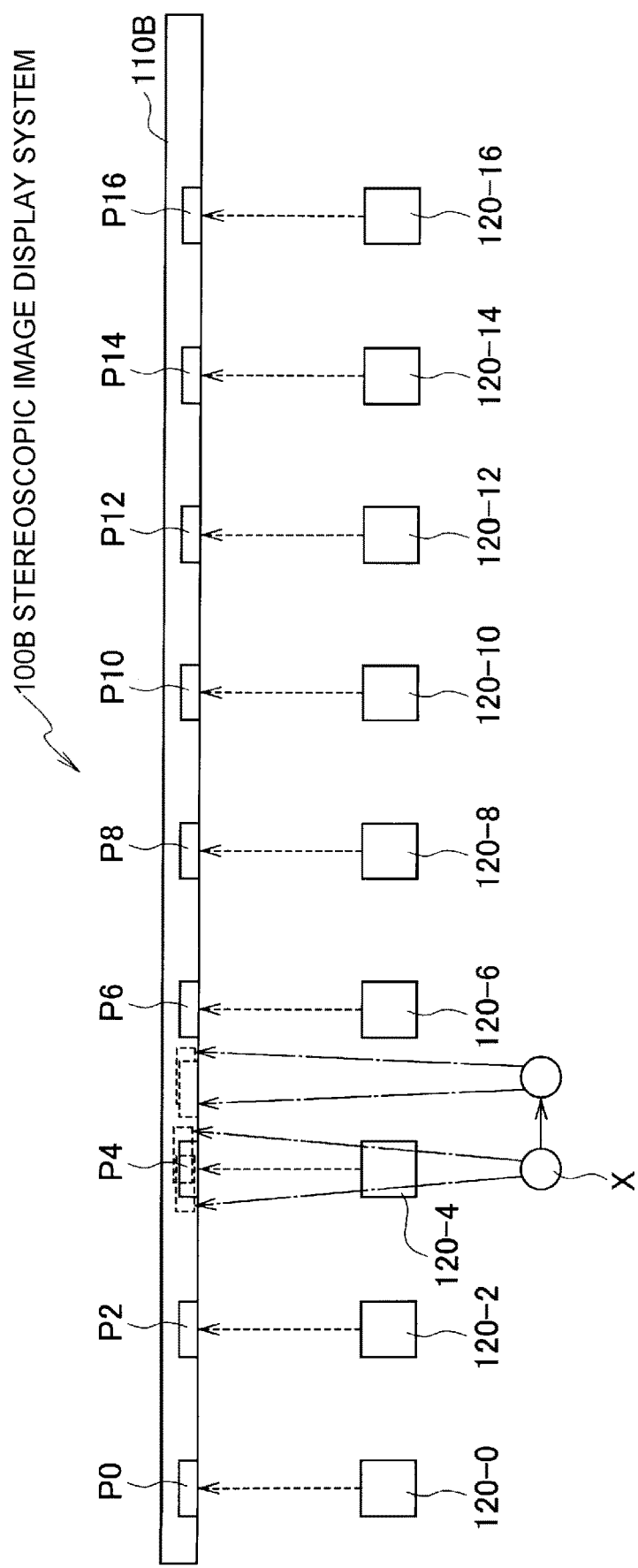
FIG. 3 is a diagram illustrating an overall configuration of another conventional stereoscopic image display system 100B.

As in a stereoscopic image display system 100B illustrated in FIG. 3, a screen 110B on which a directional image having a narrow diffusion angle can be displayed, and a visual mechanism of a human perception referred to as linear blending is utilized. As a result, a stereoscopic image that is smoothly switched with a motion parallax can be provided to an observer using a small number of projectors.

Figure 2:
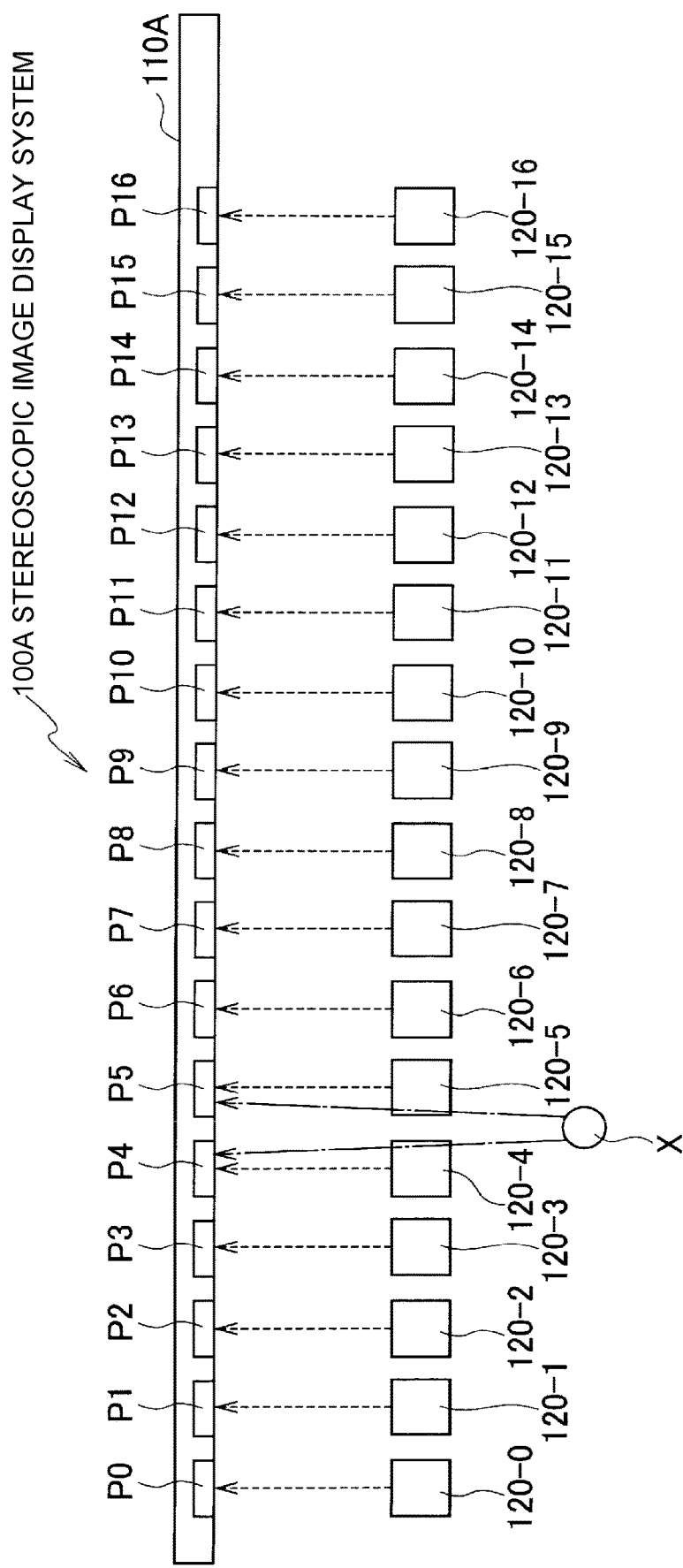
FIG. 2 is a diagram illustrating an overall configuration of a conventional stereoscopic image display system 100A.

In the stereoscopic image display system 100B illustrated in FIG. 3, a smaller number of projectors 120-0, 120-2, 120-4, . . . , 120-16 than that in the stereoscopic image display system 100A illustrated in FIG. 2 are installed side by side with predetermined spacing, and viewpoint images for installation positions related to the same object are respectively projected, as indicated by dotted lines, onto positions P0, P2, P4, . . . , P16 on the screen 110B. The screen 110B has a configuration in which two lenticular lenses are laminated, for example, and images projected from the projectors 120-0, 120-2, 120-4, . . . , 120-16 are respectively displayed at narrower diffusion angles on the corresponding positions P0, P2, P4, . . . , P16. As a result, when an observer X sees the screen 110B from a front surface of the screen 110B, two adjacent images closest in a line-of-sight direction are superimposed at a luminance ratio corresponding to distances to their respective display positions and visually recognized by the left eye and the right eye of the observer X. Specifically, the shorter the distances from the observer X to the respective display positions are, at the higher luminance the two images are superimposed and visually recognized. Thus, when the two images are visually recognized by the left and right eyes, the object is stereoscopically viewed.

For example, consider a case where the observer X has viewed the screen 110B from the front of the display position P4 on the screen 110B. The observer X visually recognizes a stereoscopic image having a phase corresponding to the position P4 by visually recognizing an image obtained by slightly superimposing an image at the position P2 on an image at the position P4 with his or her left eye and visually recognizing an image obtained by slightly superimposing an image at the position P6 on the image at the position P4 with his or her right eye. When the observer X has moved to a position corresponding to an area between the positions P4 and P6 to see the screen 110B, the image obtained by superimposing the image at the position P4 and the image at the position P6 at a luminance ratio corresponding to respective distances from the eyes to the positions P4 and P6 is visually recognized by the left eye and the right eye. At this time, the observer X visually recognizes a stereoscopic image having a phase corresponding to the position between the position P4 and the position P6 based on a parallax between the left eye and the right eye.

At this time, when a diffusion angle of the screen 110B is large, the image other than the two adjacent images that are the closest to a line-of-sight direction of the observer X is also visually recognized, which is a factor of deterioration in image quality of the image to be observed.

When the observer X is at a position corresponding to the position P4, for example, if each of the images is displayed at an ideal diffusion angle by the screen 110B, only a stereoscopic image having a phase corresponding to the position P4 is visually recognized. That is, the stereoscopic image having the phase corresponding to the position P4 is visually recognized with its luminance proportion being 100%.

However, when the diffusion angle of the screen 110B is larger than the ideal diffusion angle, the observer X visually recognizes the stereoscopic image at the position P4 with the viewpoint image at the position P2 and the viewpoint image at the position P6 superimposed thereon so that respective viewpoint image components at the positions P2 and P6 are each an image deterioration component.

If the image to be projected onto the position P4 is visually recognized in a luminance proportion of 50% and both the adjacent images to be respectively projected onto the positions P2 and P6 are each visually recognized in a luminance proportion of 25%, for example, 50% that is a sum of the respective luminance proportions of the viewpoint images at the positions P2 and P6 is an image quality deterioration component.

When the observer X has moved to the position corresponding to the area between the positions P4 and P6, if each of the images is displayed at the ideal diffusion angle by the screen 110B, an image obtained by superimposing the viewpoint image at the position P4 and the viewpoint image at the position P6 at a luminance ratio corresponding to the position of the observer X is visually recognized with its luminance proportion being 100%.

On the other hand, when the diffusion angle of the screen 110B is as large as the above-described diffusion angle, the image (a luminance proportion of 50%) obtained by superimposing the viewpoint image at the position P4 and the viewpoint image at the position P6 is visually recognized with an image (a luminance proportion of 25%) obtained by superimposing the viewpoint image at the position P2 and the viewpoint image at the position P4 and an image (a luminance proportion of 25%) obtained by superimposing the viewpoint image at the position P6 and a viewpoint image at the position P8 further superimposed thereon.

In this case, respective components of the viewpoint image at the position P4 in the image obtained by superimposing the viewpoint image at the position P2 and the viewpoint image at the position P4 and the viewpoint image at the position P6 in the image obtained by superimposing the viewpoint image at the position P6 and the viewpoint image at the position P8 are the same as a component of an image to be displayed (the image obtained by superimposing the viewpoint image at the position P4 and the viewpoint image at the position P6), and accordingly, are not each an image quality deterioration component. Therefore, 25% that is a sum of respective luminance proportions of the viewpoint image at the position P2 in the image obtained by superimposing the viewpoint image at the position P2 and the viewpoint image at the position P4 and the viewpoint image at the position P8 in the image obtained by superimposing the viewpoint image at the position P6 and the viewpoint image at the position P8 is an image quality deterioration component.

An embodiment of the present invention for reducing a proportion of the above-described image quality deterioration component will be described below.

<Configuration of Stereoscopic Image Display System According to Embodiment>

Figure 1:
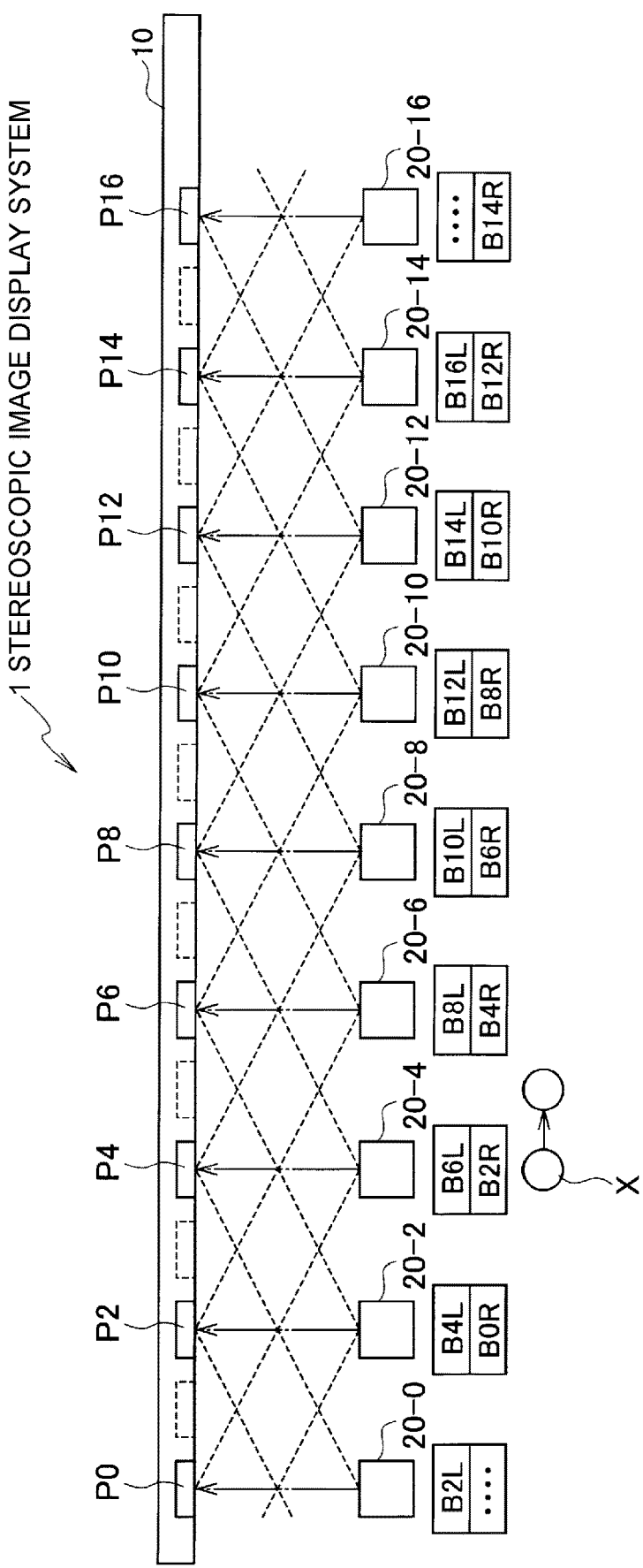
FIG. 1 is a diagram illustrating an overall configuration of a stereoscopic image display system according to an embodiment of the present invention.

A configuration of a stereoscopic image display system according to an embodiment of the present invention will be described with reference to FIG. 1. A stereoscopic image display system 1 according to the present embodiment include a screen 10 on which a plurality of directional images can be displayed, and a plurality of projectors 20-0, 20-2, 20-4, 20-6, 20-8, 20-10, 20-12, 20-14, and 20-16 that are installed side by side with predetermined spacing in a transverse direction on a front surface of the screen 10 and project respectively viewpoint images for installation positions in the same direction, the viewpoint images being related to the same object.

The screen 10 displays images projected from the projectors 20-0, 20-2, 20-4, . . . , 20-16 at a narrow diffusion angle, respectively, on corresponding positions P0, P2, P4, . . . , like the screen 110B in the above-described stereoscopic image display system 100B. As a result, when an observer X sees the screen 10 from the front surface of the screen 10, two adjacent images closest in a line-of-sight direction are superimposed at a luminance ratio corresponding to distances to their respective display positions and visually recognized by the left eye and the right eye of the observer X so that an object is stereoscopically viewed.

In the present embodiment, each of the projectors 20-0, 20-2, 20-4, . . . , 20-16 can project an image obtained by shifting a viewpoint from an adjacent projector by a larger angle than spacing between both human eyes. Accordingly, the number of projectors can be made smaller than that in the stereoscopic image display system 100A illustrated in FIG. 2, described above.

Three information, described below, are held in any one of devices in the stereoscopic image display system 1. The first information is information about base images B0, B2, B4, . . . , B16 as viewpoint images to be respectively projected onto the corresponding positions P0, P2, P4, . . . , P16 on the screen 10 from the projectors 20-0 to 20-16. The second information is image information to be used in a principle of Hidden Stereo, which is generated from each of the base images, i.e., information about a first viewpoint image to which pattern information for shifting a phase corresponding to a predetermined period is added, which is generated from each of the base images. The third information is information about a second viewpoint image from which the pattern information is subtracted, which is generated from each of the base images.

The principle of Hidden Stereo is a principle of using a viewpoint image Ik and a viewpoint image Ik+1 for a base image I ($1 \leq k \leq K-1$) to generate a parallax guidance edge D$\varphi$ a phase difference from the viewpoint image Ik of which is $\varphi$ ($\varphi$ is a real number satisfying $0 < \varphi \leq \pi/2$), adding the parallax guidance edge D$\varphi$ to the viewpoint image Ik to generate a simulated viewpoint image Ik(R), adding a positive-negative inverted image of the parallax guidance edge D$\varphi$ to the viewpoint image Ik to generate a simulated viewpoint image Ik(L), and outputting the simulated viewpoint images Ik(R) and Ik(L) ($1 \leq k \leq K-1$).

The information about the above-described base images B0, B2, B4, . . . , B16 and the respective information about the first viewpoint images and the second viewpoint images each generated from each of the base images may be respectively held in the projectors 20-0 to 20-16, or may be respectively held in other master devices (not illustrated) connected to the projectors 20-0 to 20-16.

Each of the projectors 20-0, 20-2, 20-4, . . . , 20-16 projects, as viewpoint images to be projected by the projector, the first viewpoint image generated from the base image to be projected from the adjacent projector in the preceding stage and the second viewpoint image generated from the base image to be projected from the projector in the succeeding stage onto the screen 10, from the information about the held images.

The above-described first viewpoint image and second viewpoint image respectively correspond to right eye and left eye images to be generated to cause the observer to observe a stereoscopic image by adding and subtracting a parallax guidance pattern functioning to give depth information to a person from a predetermined 2D image in the principle of Hidden Stereo. Accordingly, in FIG. 1, the first viewpoint image (right eye image) generated from the base image B0 corresponding to the position P0 is described as a "first viewpoint image B0R", and a first viewpoint image (right eye image) and a second viewpoint image (left eye image) generated from the base image B2 corresponding to the position P2 are respectively similarly described as a "first viewpoint image B2R" and a "second viewpoint image B2L".

From the projector 20-2, the first viewpoint image B0R generated from the base image B0 to be projected from the projector 20-0 in the preceding stage and a second viewpoint image B4L generated from the base image B4 to be projected from the projector 20-4 in the succeeding stage are projected onto the position P2 on the screen 10. Similarly, from the projector 20-4, the first viewpoint image B2R and a second viewpoint image B6L are projected onto the position P4. From the projector 20-6, a first viewpoint image B4R and a second viewpoint image B8L are projected onto the position P6. From the projector 20-8, a first viewpoint image B6R and a second viewpoint image B10L are projected onto the position P8. From the projector 20-10, a first viewpoint image B8R and a second viewpoint image B12L are projected onto the position P10. From the projector 20-12, a first viewpoint image B10R and a second viewpoint image B14L are projected onto the position P12. From the projector 20-14, a first viewpoint image B12R and a second viewpoint image B16L are projected onto the position P14.

At each of the positions P0, P2, P4, . . . , P16 on the screen 10, the first viewpoint image and the second viewpoint image corresponding thereto are added together and displayed by being projected by the corresponding projector.

At this time, a case where when a diffusion angle of the screen 10 is larger than an ideal angle, and the observer X at the position corresponding to P4 has viewed the screen 10, for example, the viewpoint image at the position P4 is visually recognized in a luminance proportion of 50% and the viewpoint images at the positions P2 and P6 adjacent to the position P4 are each visually recognized in a luminance proportion of 25% will be described.

The first viewpoint image B2R and the second viewpoint image B6L to be projected onto the position P4 from the projector 20-4 are images respectively generated to come closer to phases of images to be projected onto the position P4 from the base images B2 and B6. Thus, information about the images are not each an image quality deterioration component.

Images to be projected from the projector 20-2 are respectively the first viewpoint image B0R and the second viewpoint image B4L, and images to be projected from the projector 20-6 are respectively the first viewpoint image B4R and the second viewpoint image B8L. Among the viewpoint images, the second viewpoint image B4L and the first viewpoint image B4R are images respectively generated from the same base image B4 by subtracting and adding the same pattern information, and accordingly, are visually recognized as the base image B4 from the observer X because the pattern information is canceled out, and do not each generate an image quality deterioration component.

The first viewpoint image B0R to be projected from the projector 20-2 is an image that has shifted in phase from the base image B2 toward the base image B0 opposite to the base image B4, and the second viewpoint image B8L to be projected from the projector 20-6 is an image that has shifted in phase from the base image B6 toward the base image B8 opposite to the base image B4. Thus, these are image quality deterioration components.

When the states described above are combined, the luminance proportion of the image quality deterioration component is one-half the luminance proportion of the images projected from the projector 20-2 and one-half the luminance proportion of the images projected from the projector 20-6 among the images visually recognized by the observer X. The luminance proportion of the image quality deterioration component is 25% in total of the total luminance of the images. That is, the luminance proportion of the image quality deterioration component significantly decreases below 50% that is the luminance proportion of the image quality deterioration component when the observer X is at the position corresponding to P4 in the stereoscopic image display system 100B illustrated in FIG. 3, described above.

When the observer X has moved to a position corresponding to an area between P4 and P6, an image (a luminance proportion of 50%) obtained by superimposing the viewpoint images at the position P4 (the first viewpoint image B2R and the second viewpoint image B6L) and the viewpoint images at the position P6 (the first viewpoint image B4R and the second viewpoint image B8L) is visually recognized with an image (a luminance proportion of 25%) obtained by superimposing the viewpoint images at the position P2 (the first viewpoint image B0R and the second viewpoint image B4L) and the viewpoint images at the position P4 (the first viewpoint image B2R and the second viewpoint image B6L) and an image (a luminance proportion of 25%) obtained by superimposing the viewpoint images at the position P6 (the first viewpoint image B4R and the second viewpoint image B8L) and the viewpoint images at the position P8 (the first viewpoint image B6R and the second viewpoint image B10L) further superimposed thereon.

In this case, respective components of the viewpoint image at the position P4 in the image obtained by superimposing the viewpoint image at the position P2 and the viewpoint image at the position P4 and the viewpoint image at the position P6 in the image obtained by superimposing the viewpoint image at the position P6 and the viewpoint image at the position P8 are the same as a component of an image to be displayed (an image obtained by superimposing the viewpoint image at the position P4 and the viewpoint image at the position P6), and accordingly, are not each an image quality deterioration component, like in the stereoscopic image display system 100B illustrated in FIG. 3. Therefore, 25% that is a sum of respective luminance proportions of the viewpoint image at the position P2 in the image obtained by superimposing the viewpoint image at the position P2 and the viewpoint image at the position P4 and the viewpoint image at the position P8 in the image obtained by superimposing the viewpoint image at the position P6 and the viewpoint image at the position P8 is an image quality deterioration component.

When the observer X sees the screen 10 from positions respectively corresponding to the positions P0, P2, P4, . . . , P16 on the screen 10 on which images projected from the projectors are displayed, image quality deterioration is more significantly reduced than in the conventional example. When the observer sees the screen 10 from a position corresponding to a position between two of the positions P0, P2, P4, . . . , P16 on the screen 10, image quality deterioration, like in the conventional example, occurs.

Although the embodiment of the present invention has been described above, the embodiment is presented by way of example, and is not intended to limit the scope of the invention. The novel embodiment can be implemented in various other forms, and can be subjected to various omissions, replacements, and changes without departing from the scope and spirit of the invention. The embodiment and its modification are included in the scope and the spirit of the invention, and are included in the invention described in the claims and equivalents thereof.

REFERENCE SIGNS LIST

1 Stereoscopic image display system
10 Screen
20-0 to 20-16 Projector

The invention claimed is:

1. A stereoscopic image display system comprising:
a plurality of projectors that are arranged side by side with predetermined spacing and that are configured to project viewpoint images to installation positions, respectively, in the same direction, the viewpoint images being related to the same object;
a screen on which a superimposed image is displayed for the object, by causing the left eye and the right eye of an observer to visually recognize, among the images respectively projected by the plurality of projectors, two adjacent images closest in a line-of-sight direction such that the two adjacent images are superimposed on each other at a luminance ratio corresponding to distances to their respective display positions; and
an image holding unit, including one or more processors, that is configured to hold information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors,
wherein each of the plurality of projectors includes a projection unit that projects, as the viewpoint image to be projected by the projector, the first viewpoint image generated from the base image to be projected by the projector in a preceding stage and the second viewpoint image generated from the base image to be projected by the projector in a succeeding stage onto the screen, from the information about the images held by the image holding unit.

2. A stereoscopic image display method, performed by a stereoscopic image display system, comprising:
projecting, by a plurality of projectors that are implemented in the stereoscopic image display system and that are arranged side by side with predetermined spacing, viewpoint images to installation positions in the same direction, the viewpoint images being related to the same object;
displaying, by a screen, a superimposed image for the object, by causing the left eye and the right eye of an observer to visually recognize, among the images respectively projected by the plurality of projectors, two adjacent images closest in a line-of-sight direction such that the two adjacent images are superimposed on each other at a luminance ratio corresponding to distances to their respective display positions; and
holding, by an image holding unit, information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors,
wherein the stereoscopic image display method further includes, by each of the plurality of projectors, projecting, as the viewpoint image to be projected by the projector, the first viewpoint image generated from the base image to be projected by the projector in a preceding stage and the second viewpoint image generated from the base image to be projected by the projector in a succeeding stage onto the screen, from the information about the images held by the image holding unit.

3. A projector in a stereoscopic image display system, the stereoscopic image display system comprising:
a screen on which a superimposed image is displayed for an object, by causing the left eye and the right eye of an observer to visually recognize, among images respectively projected by a plurality of projectors, two adjacent images closest in a line-of-sight direction such that the two adjacent images are superimposed on each other at a luminance ratio corresponding to distances to their respective display positions, the plurality of projectors being arranged side by side with predetermined spacing and projecting viewpoint images to installation positions, respectively, in the same direction, and the viewpoint images being related to the same object; and
an image holding unit including one or more processors, that holds information about a first viewpoint image to which pattern information for shifting a phase corresponding to a predetermined period is added and information about a second viewpoint image from which the pattern information is subtracted, which are generated from each of a plurality of base images as the viewpoint images to be respectively projected by the plurality of projectors,
wherein each of the plurality of projectors comprises:
a projection unit that projects, as the viewpoint image to be projected by the projector, the first viewpoint image generated from the base image to be projected by the projector in a preceding stage and the second viewpoint image generated from the base image to be projected by the projector in a succeeding stage onto the screen, from the information about the images held by the image holding unit.

* * * * *